H. L. FERRIS.
WATER BOWL.
APPLICATION FILED JUNE 16, 1919.
1,330,439.
Patented Feb. 10, 1920.
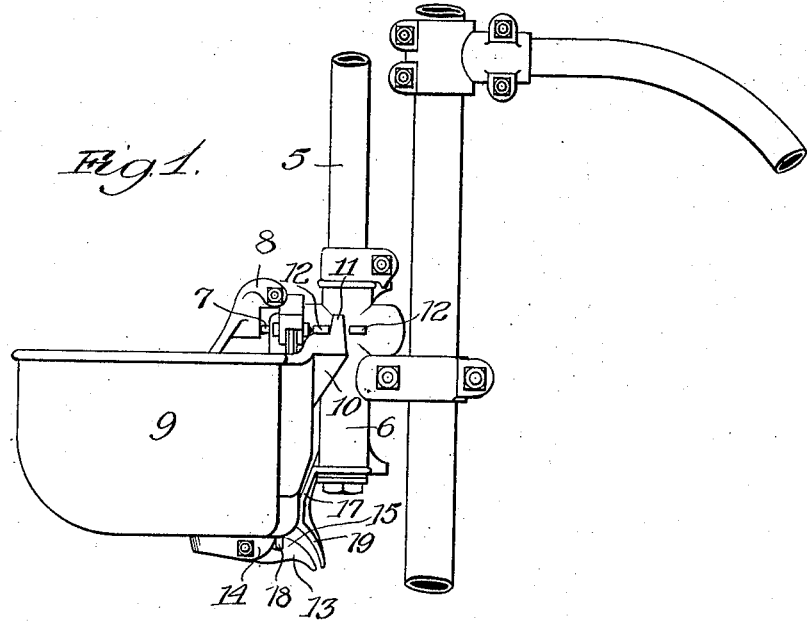
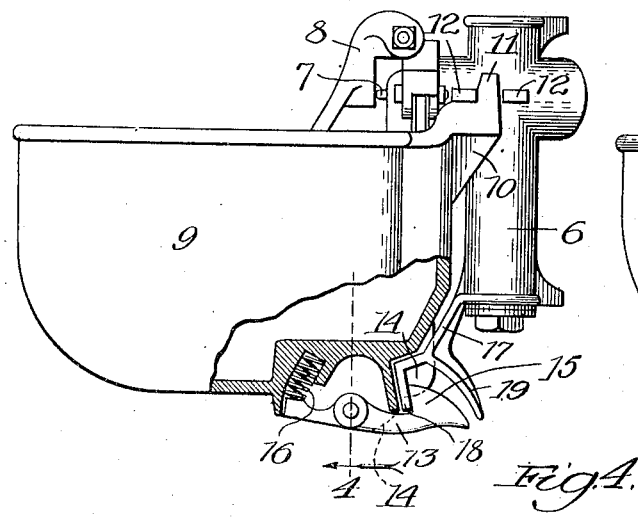
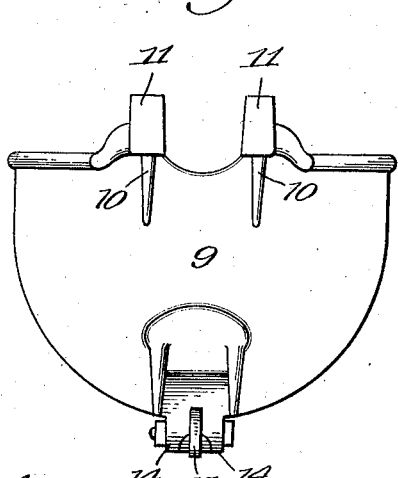
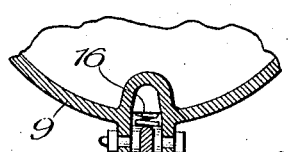
Inventor:
Henry L. Ferris,
By Dyrenforth, Lee, Chritton & Wiles,
Att'ys.

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

WATER-BOWL.

1,330,439.     Specification of Letters Patent.     Patented Feb. 10, 1920.

Application filed June 16, 1919. Serial No. 304,495.

*To all whom it may concern:*

Be it known that I, HENRY L. FERRIS, a citizen of the United States, residing at Harvard, in the county of McHenry and State of Illinois, have invented a new and useful Improvement in Water-Bowls, of which the following is a specification.

My invention relates to certain new and useful improvements in water bowls and is fully described and explained in the specification and shown in the accompanying drawings, in which Figure 1 is a side elevation of my improved device; Fig. 2 is a similar view partly in longitudinal section; Fig. 3 is the rear elevation of the bowl removed and Fig. 4 is a section on the line 4 of Fig. 2.

Referring to drawings, 5 is a water supply pipe carrying valve-containing member 6 which is secured against rotation thereon by the means described in my application filed on even date herewith and allowed Serial No. 304,494. 7 is the valve stem and 8 is the pivoted valve-operating member which lies within the bowl and is adapted to cause the entrance of water to the bowl when the member is depressed. 9 is the bowl provided at its upper edge with extensions 10 which embrace the valve-containing member 6 and have lugs 11 at their upper ends lying between pairs of lugs 12 on the valve-containing member. This arrangement securely fixes the upper edge of the bowl in position.

Similarly to secure the lower part of the bowl in proper position the bowl is provided with a latch 13 pivoted between ears 14 on the bowl and provided at its rear end with a hook 15 and at its forward end being held down by spring 16. 17 is an arm carried by the lower end of the valve-containing member and provided with a lip 18 with which the hook 15 engages and at its rear with a downwardly turned ear 19 shielding the lower end of the latch to prevent its accidental disengagement by the animals.

The present device is such that the bowl can readily be removed and replaced when desired. In removing the bowl the latch is disengaged, the lower end of the bowl swung out and the upper end of the bowl can then be swung down and disengaged. The bowl can be replaced by first engaging the lugs 11 with the lugs 12 and then swinging the lower end of the bowl inward upon which the latch 13 will automatically engage.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

I claim as new and desire to secure by Letters Patent:

1. In combination a valve-containing member, a pivoted valve-operating device, a bowl having at its upper end means for engagement with and ready detachment from the valve-containing member and having on its lower portion a pivoted spring-pressed latch having a hook at its rear end and an extension on the valve-containing member over which said hook engages to hold the lower end of the bowl in position.

2. In combination a valve-containing member, a pivoted valve operating device, a bowl having at its upper end means for engagement with and ready detachment from the valve-containing member and having on its lower portion a pivoted latch, an extension on the valve-containing member with which said latch engages to hold the lower end of the bowl in position, said extension having also a downwardly projecting lip overlying the free end of the latch for the purpose set forth.

3. In combination a vertical valve-containing member, a pivoted valve-operating device, a bowl within which the valve-operating device lies, pairs of lugs on opposite sides of the valve-containing member, flanges on the rear of the bowl partially surrounding the valve-containing member and having lugs at their upper rear corners to engage between the pairs of lugs on the valve-containing member, a downwardly projecting arm at the lower end of the valve-containing member, a pivoted spring pressed latch on the lower end of the bowl adapted to engage a lip on said arm.

4. In combination a vertical valve-containing member, a pivoted valve-operating device, a bowl within which the valve-operating device lies, pairs of lugs on opposite sides of the valve-containing member, flanges on the rear of the bowl partially surrounding the valve-containing member and having lugs at their upper rear corners to engage between the pairs of lugs on the valve-containing member, a downwardly projecting arm at the lower end of the valve-containing member, a pivoted spring pressed latch on the lower end of the bowl adapted to engage a lip on said arm, said arm also having an extension covering and shielding said latch for the purpose set forth.

In testimony whereof I have hereunto set my hand and seal this 5th day of June, 1919.

HENRY L. FERRIS. [L. S.]